(12) United States Patent
Dorn et al.

(10) Patent No.: US 8,544,425 B2
(45) Date of Patent: Oct. 1, 2013

(54) ENGINE DRIVEN GENERATOR THAT IS COOLED BY A FIRST ELECTRICAL FAN AND A SECOND ELECTRICAL FAN

(75) Inventors: Douglas W. Dorn, Sheboygan Falls, WI (US); Isaac S. Frampton, Strattanville, PA (US); Paul E. Honkanen, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 13/288,997

(22) Filed: Nov. 4, 2011

(65) Prior Publication Data

US 2013/0113218 A1    May 9, 2013

(51) Int. Cl.
*H02K 9/00*    (2006.01)

(52) U.S. Cl.
USPC .......... 123/3; 123/41.11; 123/41.49; 290/1 B; 290/22; 310/10; 310/52; 310/59

(58) Field of Classification Search
USPC ................. 123/2, 41.11, 41.15, 41.48, 41.49, 123/41.12, 3; 290/1 B, 1 A, 22; 310/10, 310/52, 59
See application file for complete search history.

(56) References Cited

U.S. PATENT DOCUMENTS

| | | | | |
|---|---|---|---|---|
| 3,276,220 A | * | 10/1966 | Miner | 62/180 |
| 3,638,718 A | * | 2/1972 | Illg | 165/287 |
| 4,313,402 A | * | 2/1982 | Lehnhoff et al. | 123/41.12 |
| 4,677,940 A | | 7/1987 | Bracht et al. | |
| 4,988,930 A | * | 1/1991 | Oberheide | 318/82 |
| 5,021,696 A | | 6/1991 | Nelson | |
| 5,577,888 A | | 11/1996 | Capdevila et al. | |
| 5,745,041 A | | 4/1998 | Moss | |
| 5,908,011 A | | 6/1999 | Stauffer et al. | |
| 5,943,986 A | | 8/1999 | Kern et al. | |
| 6,028,369 A | | 2/2000 | Hirose et al. | |
| 6,039,009 A | | 3/2000 | Hirose | |
| 6,257,832 B1 | | 7/2001 | Lyszkowski et al. | |

(Continued)

FOREIGN PATENT DOCUMENTS

| | | |
|---|---|---|
| EP | 1887197 A2 | 2/2008 |
| WO | WO-2013/067126 A1 | 5/2013 |
| WO | WO-2013/067140 A1 | 5/2013 |

OTHER PUBLICATIONS

"International Application Serial No. PCT/US2012/062975, International Search Report mailed Jan. 22, 2013", 2 pgs.

(Continued)

*Primary Examiner* — Noah Kamen
*Assistant Examiner* — Grant Moubry
(74) *Attorney, Agent, or Firm* — Schwegman, Lundberg & Woessner P.A.

(57) ABSTRACT

Some embodiments relate to an engine driven generator that includes a first electrical fan and a second electrical fan. The engine driven generator further includes a power source and a circuit connecting the power source to the first electrical fan and the second electrical fan. The circuit is configured to selectively connect the first electrical fan and the second electrical fan in series or in parallel. The circuit may operate the first electrical fan and the second electrical fan at full speed when the first electrical fan and the second electrical fan are electrically connected in parallel. The circuit may operate the first electrical fan and the second electrical fan at less than full speed when the first electrical fan and the second electrical fan are electrically connected in series.

13 Claims, 4 Drawing Sheets

(56) References Cited

U.S. PATENT DOCUMENTS

| | | |
|---|---|---|
| 6,376,944 B1 | 4/2002 | Grizzle, Jr. et al. |
| 6,407,918 B1 | 6/2002 | Edmunds et al. |
| 6,463,891 B2 * | 10/2002 | Algrain et al. ............. 123/41.12 |
| 6,630,756 B2 | 10/2003 | Kern et al. |
| 6,659,894 B2 | 12/2003 | Kern et al. |
| 6,747,432 B2 | 6/2004 | Yoshimura |
| 6,784,574 B2 | 8/2004 | Turner et al. |
| 6,824,067 B2 | 11/2004 | Kern et al. |
| 6,917,121 B2 | 7/2005 | Akimoto et al. |
| 6,933,687 B2 * | 8/2005 | Makaran et al. ................ 318/34 |
| 7,000,575 B2 | 2/2006 | Kern |
| 7,111,592 B1 | 9/2006 | Kern et al. |
| 7,129,604 B1 | 10/2006 | Wang |
| 7,248,004 B2 * | 7/2007 | Strupp ............................ 318/49 |
| 7,492,050 B2 | 2/2009 | Brandenburg et al. |
| 7,557,458 B2 | 7/2009 | Yamamoto et al. |
| 7,743,739 B2 | 6/2010 | Kochi et al. |
| 8,011,896 B2 | 9/2011 | Wu et al. |
| 2002/0195069 A1 * | 12/2002 | Herke et al. ............... 123/41.49 |
| 2003/0030281 A1 * | 2/2003 | Campion ...................... 290/1 R |
| 2005/0072553 A1 | 4/2005 | Tigner et al. |
| 2006/0152007 A1 | 7/2006 | Ortiz |
| 2008/0247879 A1 | 10/2008 | De Filippis et al. |
| 2009/0301687 A1 | 12/2009 | Watts |
| 2011/0115235 A1 | 5/2011 | Steffl |
| 2011/0248511 A1 | 10/2011 | Marlenee et al. |
| 2013/0113219 A1 | 5/2013 | Honkanen et al. |

OTHER PUBLICATIONS

"International Application Serial No. PCT/US2012/062975, Written Opinion mailed Jan. 22, 2013", 7 pgs.

"International Application Serial No. PCT/US2012/062996, International Search Report mailed Jan. 22, 2013", 2 pgs.

"International Application Serial No. PCT/US2012/062996, Written Opinion mailed Jan. 22, 2013", 6 pgs.

* cited by examiner

ENGINE DRIVEN GENERATOR THAT IS COOLED BY A FIRST ELECTRICAL FAN AND A SECOND ELECTRICAL FAN

TECHNICAL FIELD

Embodiments pertain to an engine driven generator cooling system, and more particularly to an engine driven generator cooling system that includes a first electrical fan and a second electrical fan.

BACKGROUND

Existing cooling systems for engine driven generators typically include belt-driven fans that are used to remove heat from a radiator that serves to cool the engine. These belt-driven fans are usually driven by the engines themselves.

One of the drawbacks with belt-driven fans is that they require the engine to be running in order to perform cooling. In addition, the belt-driven fans typically occupy valuable space within an enclosure that includes the engine driven generator.

Another drawback with belt-driven fans is that the speed of the fan is usually dependent upon the speed of the engine. Therefore, the degree of cooling provided by the belt-driven fan changes based on the speed of the engine.

Other existing cooling systems for engine driven generators often include direct current fans that are powered by a separate power source. These types of cooling systems typically require relative expensive and complex control systems in order to adequately cool the radiator. Both types of systems commonly generate an undesirable amount of audible noise because of (i) the size and speed of the belt driven fans; and/or (ii) the speed of the direct current fans.

In addition, many systems include a single fan that operates at variable speeds. This single fan configuration can result in (i) no cooling being provided when the single fan becomes inoperative; and/or (ii) the single fan needing to operate at an undesirably high audible-noise generating speed.

Therefore, a need exists for an engine driven generator cooling system that eliminates the need for a relatively expensive and complex control system in order to adequately cool the engine driven generator. In addition, the cooling system may provide adequate cooling while minimizing audible noise. The cooling system may also provide cooling to the radiator even when the engine is not running. Finally, the cooling system may provide cooling even when a fan that forms part of the cooling system becomes inoperative.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
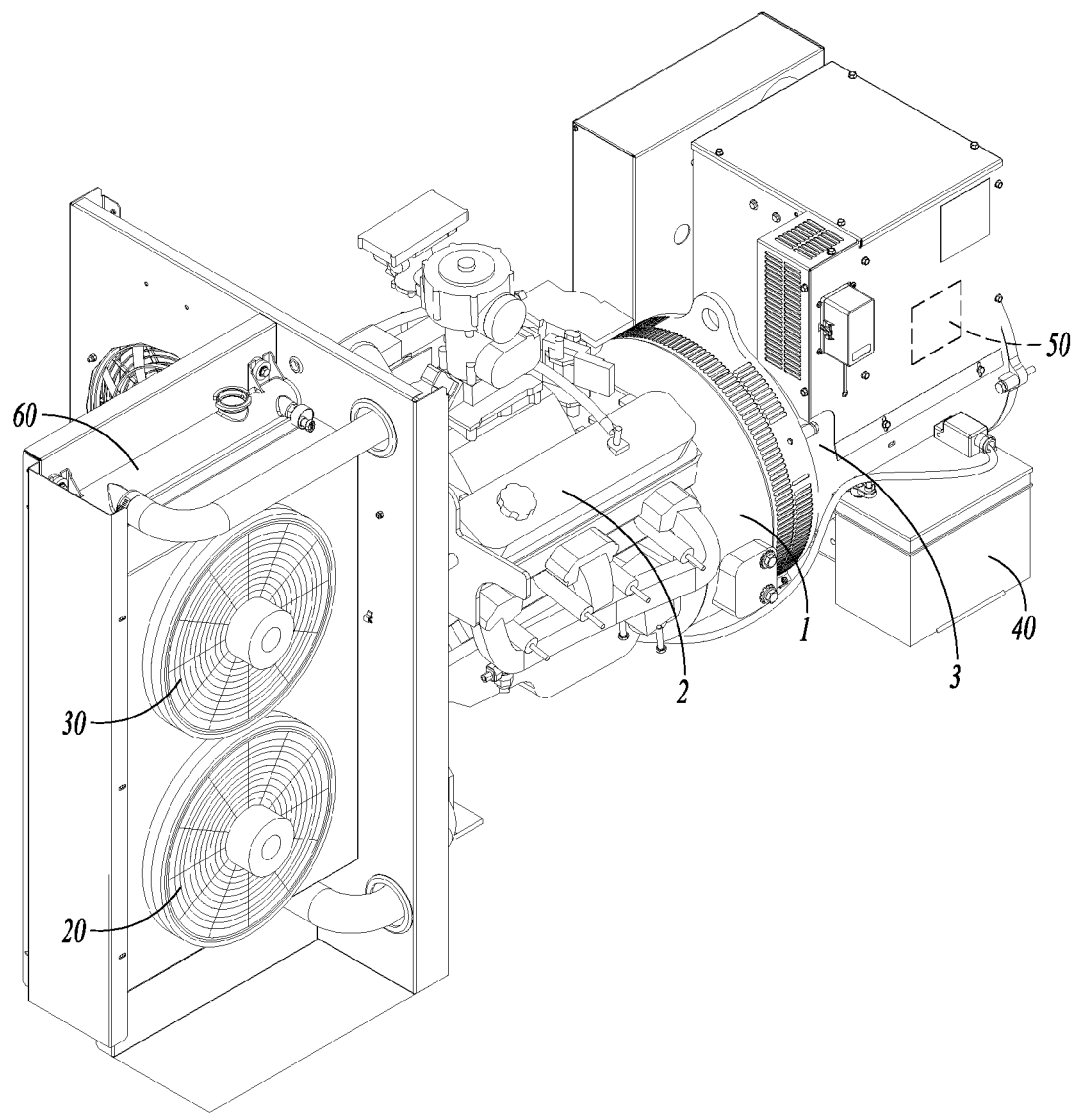
FIG. 1 is a perspective view illustrating an engine driven generator that includes a cooling system in accordance with an example embodiment.

FIG. 1 is a perspective view illustrating an engine driven generator 1 that includes a cooling system in accordance with an example embodiment. The engine driven generator 1 includes an internal combustion engine 2 and an alternator 3 driven by the internal combustion engine 2. The engine driven generator 1 includes a first electrical fan 20 and a second electrical fan 30. The engine driven generator 1 further includes a power source 40 and a circuit 50 connecting the power source 40 to the first electrical fan 20 and the second electrical fan 30. The circuit 50 is configured to selectively connect the first electrical fan 20 and the second electrical fan 30 in series (see FIG. 3) or in parallel (see FIG. 2). As examples, the first electrical fan 20 may be a 12 volt direct current fan and the second electrical fan 30 may be a 12 volt direct current fan.

Figure 2:
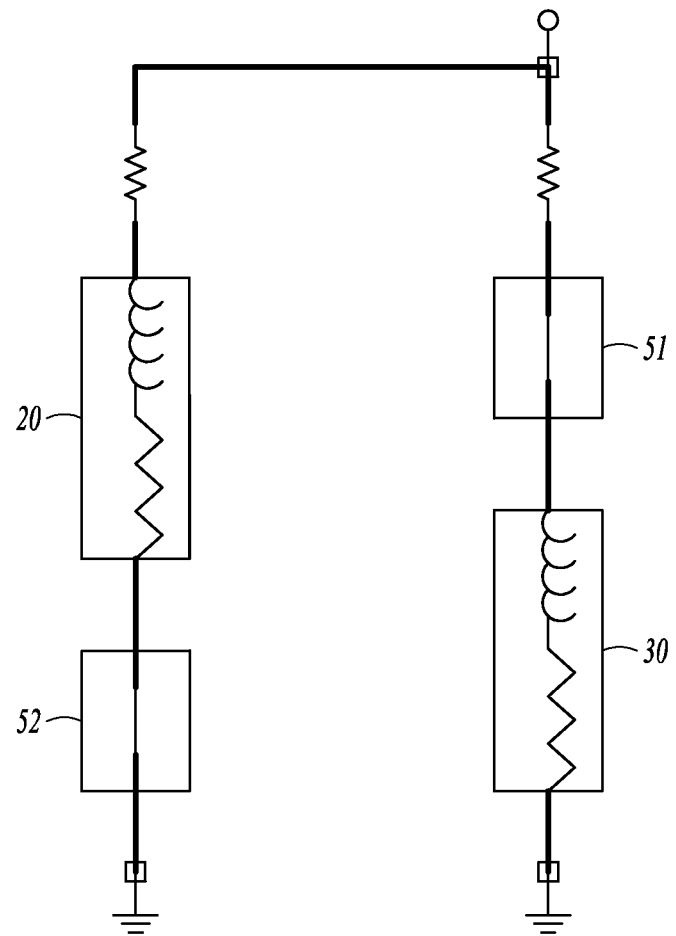
FIG. 2 is a schematic circuit diagram illustrating an example circuit that may be used with the cooling system shown in FIG. 1 where the first fan and second fan are connected in parallel.
Figure 3:
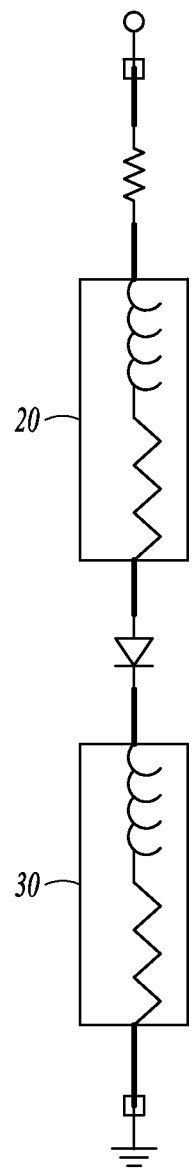
FIG. 3 is a schematic circuit diagram illustrating an example circuit that may be used with the cooling system shown in FIG. 1 where the first fan and second fan are connected in series.
Figure 4:
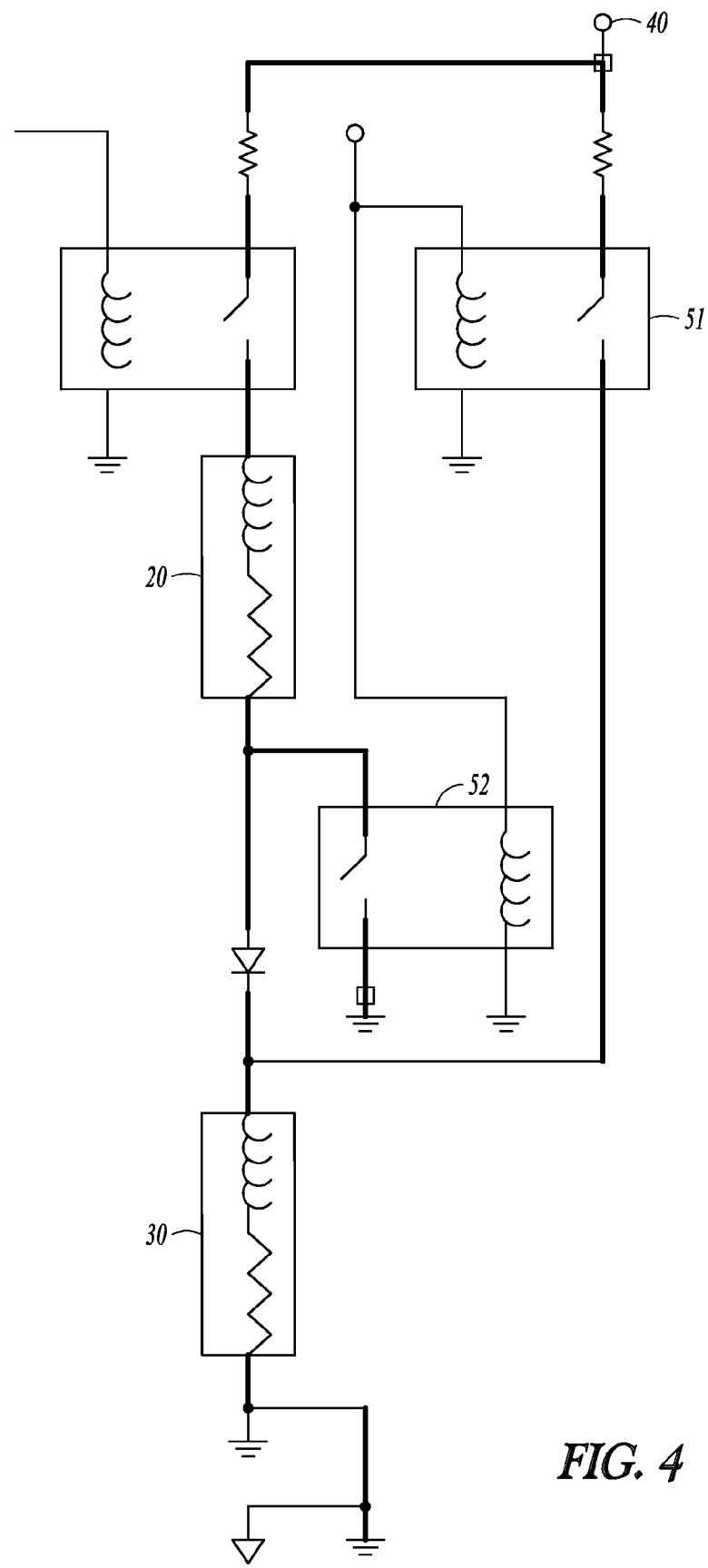
FIG. 4 is a schematic circuit diagram illustrating an example circuit that may be used with the cooling system shown in FIG. 1 where the first fan and second fan are selectively connected in series or in parallel.

As shown in FIG. 4, the circuit 50 may include relays 51, 52 that selectively connect the first electrical fan 20 and the second electrical fan 30 in series (see FIG. 3) or in parallel (see FIG. 2). As an example, during operation of the cooling system, the first electrical fan 20 and the second electrical fan 30 may be selectively connected in series (see FIG. 3) or selectively connected in parallel (see FIG. 2) by appropriately energizing a relay 51, 52.

The circuit 50 may operate the first electrical fan 20 and the second electrical fan 30 at full speed when the first electrical fan 20 and the second electrical fan 30 are electrically connected in parallel (see FIG. 2). As an example, during operation of the cooling system when the first electrical fan 20 and the second electrical fan 30 are electrically connected in parallel, if one of the first or second fans 20, 30 fails open circuit, then the other of the first or second fans 20, 30 continues to operate at full speed when the still operating fan is activated. In addition, when the first electrical fan 20 and the second electrical fan 30 operate in parallel, the first electrical fan 20 and the second electrical fan 30 may provide relatively higher air flow to facilitate greater cooling.

The circuit 50 may operate the first electrical fan 20 the second electrical fan 30 at less than full speed when the first electrical fan 20 and the second electrical fan 30 are electrically connected in series (see FIG. 2). As an example, during operation of the cooling system when the first electrical fan 20 and the second electrical fan 30 are electrically connected in series, the first electrical fan 20 and the second electrical fan 30 are each operating lower speeds. When the first electrical fan 20 and the second electrical fan 30 are operating at lower speed, they each generate relatively less undesirable audible noise.

Embodiments are also contemplated where the circuit 50 limits the current that is supplied to the first electrical fan 20 and the second electrical fan 30 when one of the first electrical fan 20 and the second electrical fan 30 fails and the first electrical fan 20 and the second electrical fan 30 are connected in series.

One example type of failure that may occur in the first electrical fan 20 and the second electrical fan 30 is when one of the first electrical fan 20 and the second electrical fan 30 short circuits. As an example, one of the first electrical fan 20 and the second electrical fan 30 may mechanically fail (e.g., by seizing, becoming obstructed or a winding failure due to over-heating).

When there is a short circuit in one of the first electrical fan 20 and the second electrical fan 30, the current will be limited by the impedance of the still operating fan. Therefore, the cooling system is able to provide cooling even when one of the first electrical fan 20 and the second electrical fan 30 becomes short circuited, which may be an improvement over known single fan cooling configurations.

It should be noted that the power source 40 may be a DC battery. Since the first electrical fan 20 and the second electrical fan 30 are operated independently from power created by the engine driven generator 1, the first electrical fan 20 and the second electrical fan 30 are able to provide cooling even when the engine driven generator 1 is not producing power.

As shown in FIG. 1, the first electrical fan 20 and the second electrical fan 30 may each direct air in the same direction. In addition, the first electrical fan 20 and the second electrical fan 30 may be adjacent to one another.

The cooling system may further include a radiator 60 such that each of the first electrical fan 20 and the second electrical fan 30 direct air through the radiator 60. In addition, the first electrical fan 20 and the second electrical fan 30 each direct air in a direction that is orthogonal to a primary axis of the engine in the engine driven generator.

The engine driven generators 1 described herein may include a cooling system that eliminates the need for a relatively expensive and complex control system in order to adequately cool the engine driven generator. In addition, the cooling system may provide adequate cooling while minimizing audible noise. The cooling system may also provide cooling to the radiator 60 even when the engine is not running. Finally, the cooling system may provide cooling even when a fan that forms part of the cooling system becomes inoperative.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
    a stationary generator having an engine and an alternator;
    a radiator coupled to the engine;
    a first electrical fan configured to cool the radiator without directing air at the engine;
    a second electrical fan configured to cool the radiator without directing air at the engine;
    a power source; and
    a circuit connecting the power source to the first electrical fan and the second electrical fan, the circuit configured to selectively connect the first electrical fan and the second electrical fan in series or in parallel.

2. The system of claim 1, wherein the circuit operates the first electrical fan and the second electrical fan at a high speed when the first electrical fan and the second electrical fan are electrically connected in parallel.

3. The system of claim 1, wherein the circuit operates the first electrical fan and the second electrical fan at a low speed when the first electrical fan and the second electrical fan are electrically connected in series.

4. The system of claim 1, wherein the circuit limits current that is supplied to the first electrical fan and the second electrical fan when one of the first electrical fan and the second electrical fan fails and the first electrical fan and the second electrical fan are connected in series.

5. The system of claim 4, wherein the circuit limits current that is supplied to the first electrical fan and the second electrical fans when one of the first electrical fan and the second electrical fan mechanically fails.

6. The system of claim 5, wherein the circuit limits current that is supplied to the first electrical fan and the second electrical fans when one of the first electrical fan and the second electrical fan seizes.

7. The system of claim 1, wherein the first electrical fan and the second electrical fan each direct air in the same direction.

8. The system of claim 7, wherein the first electrical fan and the second electrical fan are adjacent to one another.

9. The system of claim 1, further comprising a radiator such that each of the first electrical fan and the second electrical fan direct air through the radiator.

10. The system of claim 1, wherein the first electrical fan and the second electrical fan each direct air in a direction that is orthogonal to a primary axis of the engine driven generator.

11. The system of claim 1, wherein the first electrical fan is a direct current fan and the second electrical fan is a direct current fan.

12. The system of claim 1, wherein the first electrical fan is a 12 volt fan and the second electrical fan is a 12 volt fan.

13. The system of claim 1, wherein the circuit includes at least one relay that selectively connect the first electrical fan and the second electrical fan in series or in parallel.

\* \* \* \* \*